(12) United States Patent
Kusinski et al.

(10) Patent No.: US 9,316,341 B2
(45) Date of Patent: Apr. 19, 2016

(54) COATING COMPOSITIONS, APPLICATIONS THEREOF, AND METHODS OF FORMING

(75) Inventors: Grzegorz Jan Kusinski, Moraga, CA (US); Justin Lee Cheney, San Francisco, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 563 days.

(21) Appl. No.: 13/407,878

(22) Filed: Feb. 29, 2012

(65) Prior Publication Data

US 2013/0224516 A1    Aug. 29, 2013

(51) Int. Cl.

| | |
|---|---|
| *F16L 58/08* | (2006.01) |
| *C23C 4/06* | (2006.01) |
| *B32B 15/01* | (2006.01) |
| *C22C 19/05* | (2006.01) |
| *C22C 38/02* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 38/32* | (2006.01) |

(Continued)

(52) U.S. Cl.
CPC ............ *F16L 58/08* (2013.01); *B32B 15/011* (2013.01); *B32B 15/013* (2013.01); *B32B 15/015* (2013.01); *C21D 1/42* (2013.01); *C22C 19/055* (2013.01); *C22C 38/02* (2013.01); *C22C 38/06* (2013.01); *C22C 38/22* (2013.01); *C22C 38/24* (2013.01); *C22C 38/26* (2013.01); *C22C 38/32* (2013.01); *C22C 38/34* (2013.01); *C22C 38/36* (2013.01); *C23C 4/06* (2013.01); *C21D 2251/04* (2013.01); *Y02P 10/253* (2015.11); *Y10T 428/12951* (2015.01); *Y10T 428/13* (2015.01)

(58) Field of Classification Search
None
See application file for complete search history.

(56) References Cited

U.S. PATENT DOCUMENTS

| | | |
|---|---|---|
| 2,868,667 A | 1/1959 | Bowles |
| 4,382,976 A | 5/1983 | Restall |

(Continued)

FOREIGN PATENT DOCUMENTS

| | | |
|---|---|---|
| EP | 0384054 | 8/1990 |
| JP | 07-138727 | 5/1995 |

(Continued)

OTHER PUBLICATIONS

English Translation of Takeda et al. JP 07-138727 printed Mar. 19, 2014.*

(Continued)

*Primary Examiner* — Adam Krupicka
(74) *Attorney, Agent, or Firm* — King & Spalding LLP (57) ABSTRACT

Equipment having a protective coating layer for use in abrasive environments, e.g., sulfur-containing environments, is disclosed. The coating is formed from a single-component feedstock, as a Fe-based alloy composition comprising at least two refractory elements selected from Cr, V, Nb, Mo and W in an amount of up to 30% each and a total concentration of up to 40%. In one embodiment, the coating is applied by thermal spraying, followed by heat treatment for at least a portion of the refractory elements in the coating to fuse into the substrate forming a metallurgically bonded coating. The coating has an adhesion strength of at least 7,000 psi measured according to ASTM D4541. The coating layer is further characterized as being impermeable to corrosive environments showing no pin holes in the ferroxyl test according to ASTM A967 Practice E.

16 Claims, 4 Drawing Sheets

(51) Int. Cl.
*C22C 38/34* (2006.01)
*C22C 38/36* (2006.01)
*C21D 1/42* (2006.01)

(56) References Cited

U.S. PATENT DOCUMENTS

| | | | |
|---|---|---|---|
| 4,410,604 | A | 10/1983 | Pohlman et al. |
| 4,444,587 | A | 4/1984 | Kelly |
| 4,532,191 | A | 7/1985 | Humphries et al. |
| 4,623,087 | A * | 11/1986 | Conolly ............... 228/176 |
| 4,942,922 | A | 7/1990 | Redmerski et al. |
| 5,183,636 | A | 2/1993 | DuBois |
| 5,500,252 | A | 3/1996 | Meelu |
| 5,555,916 | A | 9/1996 | Kushida |
| 5,779,842 | A | 7/1998 | Fawcett et al. |
| 5,919,577 | A | 7/1999 | Hasegawa et al. |
| 6,165,286 | A | 12/2000 | Bayer et al. |
| 6,592,941 | B1 | 7/2003 | Bayer et al. |
| 6,682,780 | B2 | 1/2004 | Tzatzov et al. |
| 7,392,930 | B2 | 7/2008 | Rangaswamy et al. |
| 7,455,811 | B2 | 11/2008 | Sjodin |
| 7,794,783 | B2 | 9/2010 | Patel et al. |
| 2003/0200835 | A1 | 10/2003 | Malie et al. |
| 2006/0090820 | A1 | 5/2006 | Rabinkin et al. |
| 2008/0063887 | A1 | 3/2008 | Nakamura et al. |
| 2008/0145649 | A1 * | 6/2008 | Mannem et al. ............... 428/336 |
| 2008/0166493 | A1 | 7/2008 | Xiao et al. |
| 2009/0202717 | A1 | 8/2009 | Morra et al. |
| 2009/0311103 | A1 | 12/2009 | Arikawa et al. |
| 2011/0064963 | A1 | 3/2011 | Cheney et al. |
| 2011/0229665 | A1 | 9/2011 | Beardsley et al. |

FOREIGN PATENT DOCUMENTS

| | | |
|---|---|---|
| JP | 10-195625 | 7/1998 |
| KR | 10-0201694 | 6/1999 |

OTHER PUBLICATIONS

U.S. Appl. No. 13/407,859, filed Feb. 29, 2012, Cheney, et al.

ASTM Standard A967-05, Standard Specification for Chemical Passivation Treatments for Stainless Steel Parts, 2005, ASTM International (www.astm.org).

Benn et al., Restoration of a Petroleum Refinery Vessel Using Weld Metal Overlay, 1998, NACE International, Corrosion98, Paper No. 581 pp. 1-13.

Dennis et al., Weld Overlay Examination Using Ultrasonic Phased Array Technology, Oct. 2007, 6th Int'l Conf. on NDE in Relation to Structural Integrity for Nuclear and Pressurized Components, pp. 1-14 (www.ndt.net/search/docs.php3?MainSource=70).

Lai et al., Corrosion Control by Modern Weld Overlay Technology, 1999, G. Lai, P. Hulsizer, Proceedings of 14th International Corrosion Congress, Sep. 26-Oct. 1, 1999, Cape Town, South Africa, International Corrosion Council.

McEnerney, Recommended Practices for Local Postweld Heat Treatment, 1997, Cooperheat, Inc., Piscataway, NJ (www.atimetals.com/businesses/business-units/wahchang/Documents/Tech-Serv-Library/1997-Conf-Proceedings/1997017.pdf).

Weld overlay cladding jobs completed in two weeks, Jul. 5, 2004, Arc Energy Resources, Manufacturingtalk.

International Search Report and Written Opinion of the International Searching Authority regarding PCT/US2012/070358, dated Apr. 24, 2013 (12pp.).

* cited by examiner

COATING COMPOSITIONS, APPLICATIONS THEREOF, AND METHODS OF FORMING

CROSS-REFERENCE TO RELATED APPLICATIONS

NONE

TECHNICAL FIELD

The invention relates generally to a coating for use in corrosive and/or erosive environments, applications employing the coating, and methods to form the coating.

BACKGROUND

Corrosion is a problem for many industries, for example corrosion costs within U.S. refineries alone total $4,000,000,000 annually. As corrosion is a surface phenomenon, one method to combat corrosion and extend the lifetime of a work piece is modifying the surface of a corroding part with a thin layer of corrosion resistant material, via weld overlay or thermal spray. For some applications, these solutions are not used often due to costs and/or unsatisfactory performance.

U.S. Pat. No. 4,532,191 discloses a method to protect parts against high temperature corrosion by forming a laser cladding layer of MCrAlY (M=Fe, Ni, or Co) in an inert atmosphere. U.S. Pat. No. 4,382,976 discloses the use of plasma spraying to protect an article with an overlay coating of MCrAlY, formed with a halide activator. In U.S. Pat. No. 6,165,286, the alloy MCrAlY is applied via thermal spray followed a thermal sprayed aluminum alloy, then a heat treatment. U.S. Pat. No. 6,682,780 discloses the use of reactive sintering to create solid coatings during a heat treatment process, using two or more separate powders of distinctly different alloys as constituents to form the coating. For protective erosion (abrasive) resistant coatings, U.S. Pat. No. 2,868,667 discloses a hard surfacing ("hard facing") method of using a two component mixture of soft and hard particles, wherein the soft mixture melts and binds the hard particles to the substrate to be hard faced.

In some prior art coating disclosures particularly with alloy compositions of MCrAlY, substrate damage can occur due to: a) partial or complete melting of the substrate, and/or b) embrittlement of the substrate due to the formation of heat affected zones. Conventional techniques such as welding are not typically used for alloys of the type MCrAlY due to cost, weldability concerns, and dilution effects. However, techniques such as thermal spray or sputtering do not produce fully dense coatings or are not thick enough to significantly increase the lifetime of the part. Brazing is commonly used to join similar or dissimilar metals using a technique that does not melt the base metals to be joined, with the brazing temperatures being lower than the melting points of the base metals, using brazing materials designed to flow across a surface and into tight joints through capillary action. Properly designed brazing alloys form a strong metallurgical bond with the substrate material. Amorphous metals have been disclosed for use as brazing materials to join surfaces in U.S. Pat. Nos. 4,410,604; 7,392,930; and 7,455,811; and in US Patent Publication Nos. 20060090820 and 2003020083. U.S. Pat. No. 7,794,783 discloses a method to form a wear-resistant coating by heating a coating material comprising a brazing material and hard particles to a temperature above a solidus temperature of the braze material.

There is still a need for coatings with improved corrosion and/or erosion resistant characteristics, particularly coatings formed with a single component. There is also a need for improved methods to apply coatings, particularly with the use of brazing materials.

SUMMARY

In one embodiment, a method to form a single-component protective coating is provided. The method comprises: preparing a substrate on the work piece to be coated, the substrate having a melting point of $T_s$; applying onto the substrate a coating layer from a single-component feedstock, the feedstock is a Fe-based alloy composition containing at least two refractory elements selected from Cr, V, Nb, Mo and W in an amount of up to 30% each and a total concentration of up to 40%, and having a melting point of $T_m$; and subjecting the coating layer to heat treatment for the coating layer to be heated to a temperature above $T_m$ and below $T_s$ for at least a portion of the refractory elements to diffuse across an interface between the coating layer and the substrate into the substrate, for the substrate to be alloyed forming a metallurgical bond with coating layer. The coating layer has an adhesion strength of at least 7,000 psi measured according to ASTM D4541.

In another aspect, the invention relates to a method for forming a protective coating on an interior surface of a tubing. The method comprises: providing a carrier sheet; applying onto a carrier sheet a coating layer from a single-component feedstock, the feedstock is a Fe-based alloy composition containing at least two refractory elements selected from Cr, V, Nb, Mo and W in an amount of up to 30% each and a total concentration of up to 40%; inserting the carrier sheet into the tubing for the coating layer to be against the interior surface of the tubing; subjecting the tubing to heat treatment at a sufficient temperature for at least a portion of the refractory elements in the coating layer to diffuse into the interior surface of the tubing forming a metallurgical bond with the tubing. The coating layer has an adhesion strength of at least 7,000 psi measured according to ASTM D4541.

In yet another aspect, the invention relates to a work piece for use in an abrasive environment. The work piece comprises: a metal substrate having a melting point of $T_s$; a coating layer deposited onto the metal substrate from a single-component feedstock, the feedstock is a Fe-based alloy composition containing at least two refractory elements selected from Cr, V, Nb, Mo and W in an amount of up to 30% each and a total concentration of up to 40%, and having a melting point of $T_m$; wherein at least a portion of the refractory elements in the coating layer diffuse into the metal substrate for the metal substrate to have a gradient composition, in which the metal substrate is alloyed with at least a portion of the refractory elements for the metal substrate at a depth at least 25 μm from an interface between the coating layer and the substrate to have a concentration of refractory elements of at least 25% of the concentration of refractory elements in the alloy composition.

In one aspect, the invention relates to a tubing for use in a corrosive environment with a protective corrosion resistant layer on its interior surface. The tubing comprises: a carrier sheet having two edges, a first side and a second side opposite to the first side having a protective layer deposited thereon, the layer prepared from a single-component feedstock comprising a Fe-based alloy composition having least two refractory elements selected from Cr, V, Nb, Mo and W in an amount of up to 30% each and a total concentration of up to 40%. The carrier sheet is inserted into the tubing for the two edges to overlap and for the first side to form the surface exposed to the corrosive environment, and for the second side with the protective layer to be in contact with the interior surface of the tubing. The carrier sheet upon being subject to heat treatment, at least a portion of the refractory elements in the protective layer to diffuse into the interior surface of the tubing forming a metallurgical bond with the tubing. The protective layer has an adhesion strength of at least 7,000 psi measured according to ASTM D4541.

DETAILED DESCRIPTION

The following terms will be used throughout the specification and will have the following meanings unless otherwise indicated.

A "layer" is a thickness of a material that may serve a functional purpose including but not limited to erosion resistance, reduced coefficient of friction, high stiffness, or mechanical support for overlying layers or protection of underlying layers.

"Coating" is comprised of one or more adjacent layers and any included interfaces. Coating also refers to a layer is placed directly on the substrate of the article to be protected. In another embodiment, "coating" refers to the top protective layer.

"Substrate" refers to a portion or the entire surface an article, e.g., a work piece, equipment or portions of an equipment to be protected by a coating of the embodiment. The article (i.e., equipment, work piece) to be coated can be of any shape, e.g., tools, the interior of a structural component such as a pipe, a vessel, or a tank.

"Refractory elements" refers to Cr, V, Nb, Mo, and W, metals that are resistant to heat and wear, with a higher melting temperature than steel.

"Single component coating" refers to coating formed with a single feedstock material whether the feedstock is in the form of a wire or a powder, this is opposed to a multi-component (or two-component) coating formed by two or more distinct alloys (in the form of a wire or powder), or by the brazing of two different materials forming a coating.

"Interface" refers to the initial layer between the coating layer and the substrate layer, wherein subsequently a transition region is formed between the coating layer and the substrate with one or more constituent material composition and/or property value changes from 5% to 95% of the initial values that characterize each of the adjacent layers.

In one embodiment, the invention relates to brazing methods in which no joining is used, wherein a single-component braze material is melted and flows across the surface of the substrate forming a protective coating. As in a typical brazing technique, a strong metallurgical bond is created between the substrate and the coating created by the brazing composition. In another embodiment, the coating formed by the mechanically bound coating alloy is disclosed with a sufficiently low heat treatment operation to minimize damage the substrate in any manner. The coating as formed with the alloy composition of the invention is characterized as being fully protective of the substrate, exhibit minimal or no through-porosity or dilution, providing the work piece with corrosive and/or erosive resistant characteristics.

Alloy Compositions: The alloy composition is designed using computational metallurgical techniques for forming a protective coating characterized as having a melting point that is sufficiently below the melting temperature of a typical substrate to be protected, e.g., mild steel or carbon steel with a melting point $T_m$ of 2600-2800° F. Additional considerations include a sufficient amount of at least two alloying components characterized as corrosion resistant, e.g., refractory elements such as Cr, V, Nb, Mo and W which have melting temperatures in descending order of: $T_m$(W)=6192° F.>$T_m$(Mo)=4753° F.>$T_m$(Nb)=4491° F.>$T_m$(V)=3479° F.>$T_m$(Cr)=3375° F.>$T_m$(Fe)=2800° F. and $T_m$(carbon steel)=2600-2800° F. In one embodiment, the alloy composition has a $T_m$ in the range of 2140-2240° F.

In one embodiment, the alloy composition contains at least two refractory elements selected from Cr, V, Nb, Mo and W each in an amount of up to 30% each and a total concentration of up to 40%. In another embodiment, the alloy has a composition in weight %: 10-30% Cr and at least a refractory element selected from V, Nb, Mo and W in an amount of up to 20% each; balance of Fe and unavoidable impurities.

Refractory elements have been identified as key elements to reducing the corrosion rate, specifically the sulphidation rate, of iron alloys. However, silicon and aluminum have also been demonstrated as elements which can significantly improve sulfur related corrosion performance. In one embodiment, the alloy composition further contains at least one of Al and Si, in an amount of up to 10% each.

In one embodiment, the alloy composition is a steel alloy having a plurality of components as defined in weight percent as: Fe (55-65%), Cr (0-30%), R (4-30%), Si (0-10%), B (0-3%), and Al (0-20%), with R is at least a refractory element selected from V, Mo, Nb, and W. In another embodiment, the alloy composition comprises any of the following chemistries, given in weight percent:

Alloy 1: Fe-60.8%, Cr-22.1%, Mo-9.5%, Si-3.6%, B-2.8%, Al-1.1%;
Alloy 2: Fe-60.8%, Cr-22.1%, Nb-4.8%, V-4.8%, Si-3.6%, B-2.8%, Al-1.1%;
Alloy 3: Fe-56.8%, Cr-21.6%, Mo-12.8%, Si-5.6%, B-2.2%, Al-1.1%;
Alloy 4: Fe-61.7%, Cr-12%, Nb-5%, V-5%, Si-3.6%, B-2.75%, Al-10%;
Alloy 5: Fe-61.7%, Cr-17%, Nb-5%, V-5%, Si-3.6%, B-2.75%, Al-5%;

Alloy 6: Fe-65.9%, Cr-24.6%, Mo-4.6%, Si-1.5%, B-2.2%;

Alloy 7: Fe-65.9%, Cr-24.6%, V-4.6%, Si-1.5%, B-2.2%.

Figure 1:
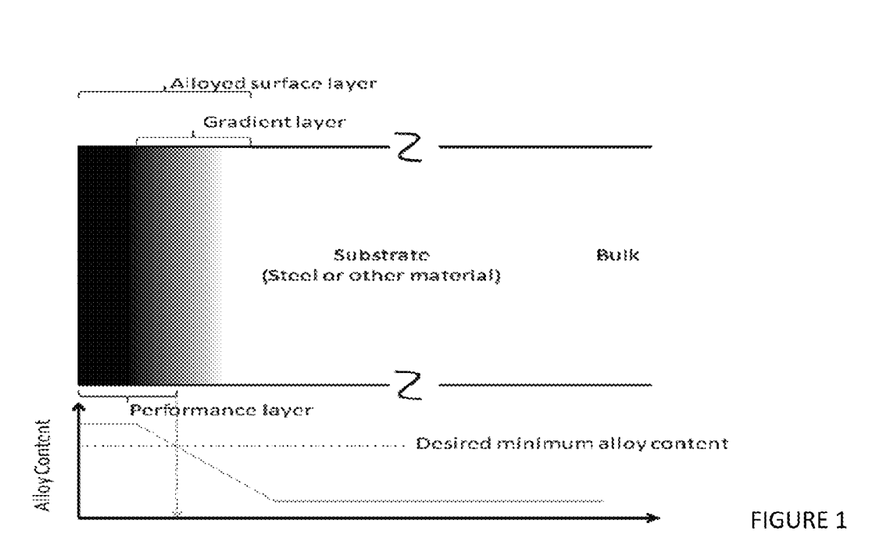
FIG. 1 is a diagram illustrating the composition gradient across the thickness of a substrate coated with one embodiment of the alloy composition.

After coating and heat treatment, the alloy composition forms a coating layer with a composition gradient across the thickness of the coating as illustrated in FIG. 1, which compositional gradient can act to reduce stresses during thermal cycling and/or add composition control of the coating layer to protect the underlying substrate. In the figure, grayscale contrast is used to depict the level of alloying (black=high, white=none) at various distances reaching from the surface into the bulk of the alloy.

As illustrated in FIG. 1, the alloy composition in the bulk of the coating is relatively high and constant in the exterior layer of the coating (the black region on the far left of the diagram). This layer is defined as the coating layer. The shading illustrates the gradient profile beneath the interface, with a drop in the concentration further away from the interface as illustrated by a change in the shading from dark gray to lighter gray then white. As the corrosion performance of the substrate is dictated by the level of alloying, at some distance from the coating interface, the concentration of the alloy elements reaches a point wherein it is no longer satisfactory for corrosion performance. This layer is defined as the performance layer as indicated in the FIG. 1.

In one embodiment, the performance layer is at a distance of at least 10 μm from the interface and with an average concentration of refractory elements of at least 25% of the concentration of refractory elements in the coating layer (as formed by the brazing alloy composition). In another embodiment, the performance layer is at least 20 μm from the interface of the substrate and the coating layer. In a third embodiment, the performance layer is at least 50 μm from the interface layer.

In one embodiment, the depth of the performance layer as well as the concentration of the refractory elements alloyed into the substrate (after the heat treatment step) can be effectively controlled. Additionally, the specific elements that diffuse into the substrate as well as the elements or phases in the gradient layer can also be controlled, as smaller elements, i.e., Fe, Cr, V, etc. can more easily diffuse into the substrate leaving behind relatively larger refractories (i.e., W, Nb, Mo). The larger refractory elements in one embodiment form thermally insulating phases such as carbides, borides, silicides, or oxides to provide enhanced corrosion resistance through refractory enrichment in the matrix of the gradient layer adjacent to the interface.

In one embodiment, the relatively large refractory (i.e., W, Nb, Mo) content in the coating layer increases at least 5% due to the selective diffusion of smaller elements over the interface and into the substrate during the heat treatment operation. In another embodiment the relatively larger refractory content increases by at least 10%. In a third embodiment, the relatively large refractory content increases by at least 30%.

Methods to Form Coatings: The alloy composition, as cored wire, solid wire, or powder feedstock, can be applied onto the substrate of the equipment (work piece) using a variety of methods including but not limited to welding, kinetic spray, physical vapor deposition (PVD), chemical vapor deposition (CVD), and thermal spray. The alloy can be applied as a single layer, or as a plurality of layers, with a total thickness of 0.5 to 150 mils (12.7-3810 μm) in one embodiment; from 1 to 100 mils (254-2540 μm) in a second embodiment; and from 5 to 50 mils (127-1270 μm) in a third embodiment.

The substrate to be coated with the alloy composition can be constructed of iron, nickel, cobalt, or copper based alloy. In one embodiment, it is carbon (mild) steel. In one embodiment prior to the deposition of the coating, the substrate surface is given a cleaning to remove all diffusion barriers such as paint, coatings, dirt, debris, and hydrocarbons. In another embodiment, the surface is given an anchor profile abrasive blast ranging from 0.5 mils (0.0254 mm) to 6 mils (0.1524 mm) to provide initial profile for the thermal sprayed coating to better mechanically bond to the substrate.

In one embodiment, the alloy composition is deposited via the thermal spray technique, which allows for quick a quick application (e.g., 25 lbs/hr or more) of a thick coating of material onto the substrate in a controlled and measurable manner. The thermal spray coating can be any of conventionally sprayed flame, arc wire, plasma, or HVOF (high velocity oxy fuel) techniques.

In the heat treatment step, a sufficient amount of heat is applied to melt the alloy composition for a coating with a thickness substantially close to the original thickness. In one embodiment, the equipment with the alloy coating is heat treated in a commercial vacuum furnace. In another embodiment, the heat treatment can be local using techniques including but not limited to induction heating, combustion burner, electric resistance heaters, etc. The heat treatment ranges from 10-60 minutes in one embodiment, and from 15 to 45 minutes in a second embodiment, wherein the alloy is fused onto the base metal substrate and for the alloy flow across the substrate surface, eliminating coating porosity and the possibility of uncoated exposed surfaces. In one embodiment, the heat treatment is via induction heating due to its rapid and controllable heat treatment potential, melting the alloy composition to form a fully protective layer at temperatures below the melting temperature of the substrate.

Figure 3:
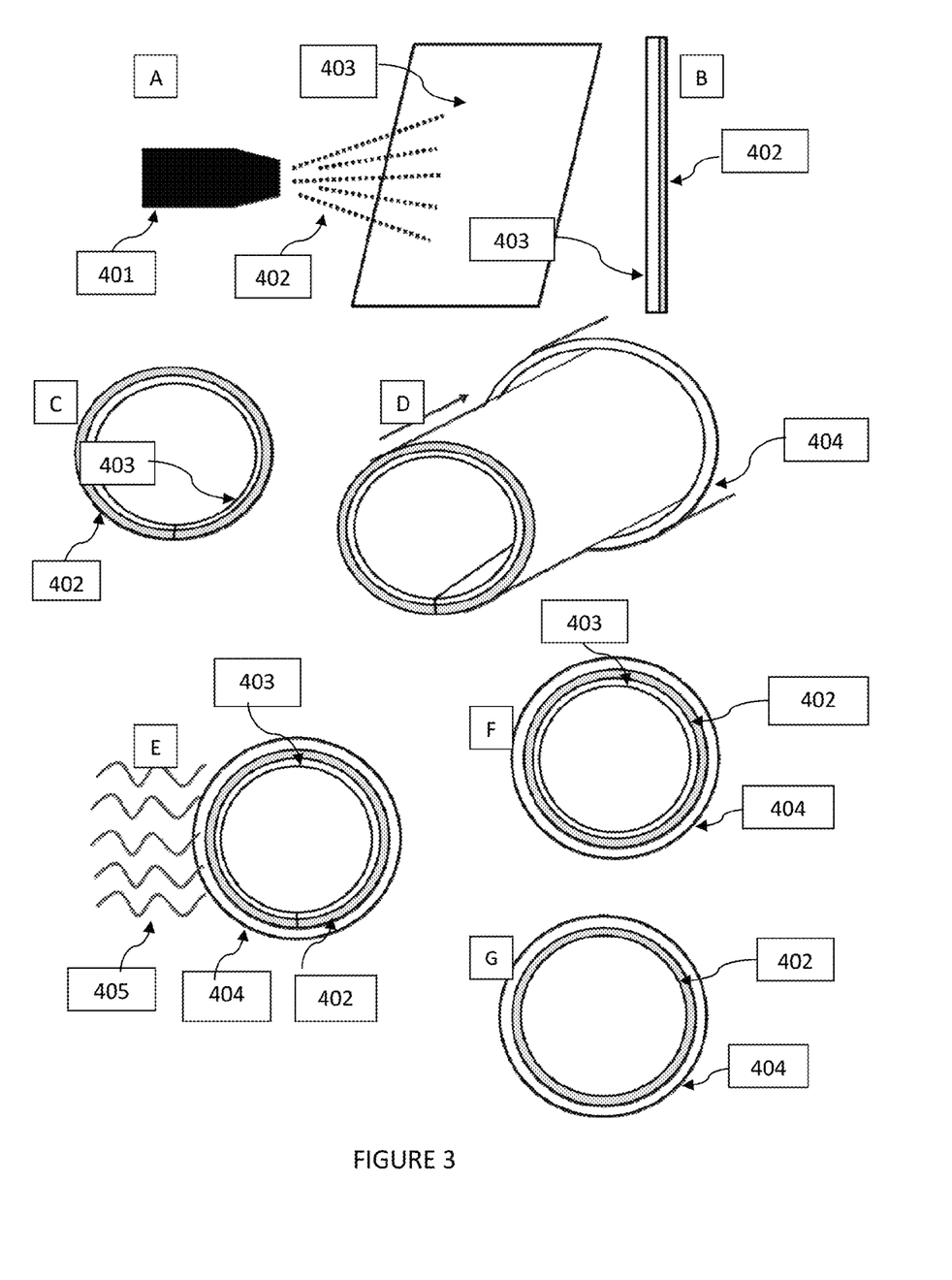
FIG. 3 is diagram illustrating an embodiment of a method for coating a work piece with the use of a carrier sheet.

In one embodiment to provide coating protection for interior of tubes or tubing, e.g., having relatively small diameters (6" or below) and that are relatively long (10' or above), an apparatus scheme as illustrated in FIG. 3 is employed. As shown, a steel tubing 901 is fed into position on top of a moving conveyer or rollers 903, for its interior to by coated (throughout its length) in the spray zone by spray assembly 905. The mechanical assembly in one embodiment has one or more spray guns 906 connected to the assembly, which may be stationary or rotating, spraying the coating alloy 907 onto the interior surface of the tubing. The mechanical assembly traverses along the length of the tubing via an arm assembly 902 to spray the entire interior length of the tubing. Control of the mechanical assembly can be separate from the spray guns 906 in a containerized spray booth 904. The heat treatment operation takes place at one end of the pipe using techniques known in the art, e.g., induction coil 908, causing the brazed coating to fuse onto the substrate forming a protective layer.

Figure 2:
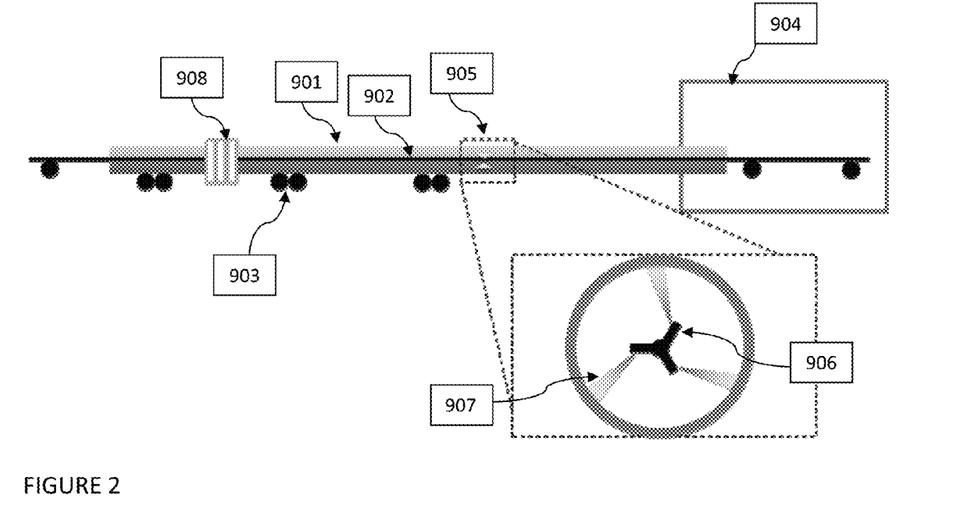
FIG. 2 is diagram illustrating an embodiment of a method for coating interior of a pipe or tubing.

In another embodiment to provide coating protection for interiors of relatively long and relatively small diameter tubing, or for interior of equipment difficult geometries, the use of a carrier sheet is employed as illustrated in FIG. 2. The carrier sheet can be of the same or different composition from the substrate to be coated, having a sufficient thickness that allows the carrier sheet to bend and conform to the shape of the equipment to be protected. The carrier sheet has a surface area that is slightly larger than the surface area of the substrate to be coated with the alloy composition.

In one embodiment, the carrier sheet has a thickness ranging from 0.5-100 mils. In a second embodiment, a thickness of 5-50 mils. In one embodiment, the carrier sheet comprises carbon steel. In another embodiment, the carrier sheet comprises stainless steel. After the carrier sheet is coated with the alloy composition, it is then placed onto the equipment to be coated with adjacent or slightly overlapping edges, with the alloy coating surface to be in intimate contact with the substrate to be protected. In a heat treatment step, the brazing material preferably melts and diffuses into the substrate to be coated.

In one embodiment for the coating of a plurality of tubings, a large carrier sheet can be used. After being coated with the alloy composition, the carrier sheet is then cut into multiple smaller sheets each with a surface area sufficient to fully cover the interior or exterior of the tubings to be protected. The subsequent heat treatment step can be part of the quench and temper stage of the tubing, in a normal manufacturing process.

In one embodiment for the protection of a tubing interior, after the carrier sheet is placed within the tubing, a sufficient amount of external force in the form of another sheet (as a forming sheet) or a rod, etc., is applied against the carrier sheet to press the surface with the coating layer to be in intimate contact with the interior of the tubing.

As shown in the Figure, a flat and thin ductile sheet ("carrier sheet") 403 is sprayed with the alloy 402 over the entire surface along one side of the sheet. In one embodiment, the carrier sheet is a flexible metal sheet, which forms the interior of the tubing and can be subsequently removed or corroded away on its own. The thermal spraying of such a geometry is simple and can be done quickly and in a relatively simple manner as compared to spraying interior pipe surfaces. Subsequently the sheet 403 is rolled up, and inserted into a piping 404 for the edges of the sheet 403 to overlap, and for the sheet to abut the piping 404 such that the alloy coating 402 is positioned in contact with the interior surface of the pipe. Thus, if only one side of the sheet is sprayed, the uncoated side of the sheet is not in contact with the interior piping surface and faces the centerline of the tubing. The pipe 404 is then heat treated with a heat source 405 to a temperature which melts the alloy coating 402 but not the pipe 404 or the sheet 403, forming a protective coating surface which is now sandwiched between the interior pipe walls and the carrier sheet 403.

In this process, the sheet 403 is used only as a carrier for the brazing material, which may be difficult itself to be formed into sheets, and requires no performance criteria such as corrosion performance. After the heating process, the carrier sheet 403 can be ground away, or left to provide some level of protection before being corroded or eroded away under the conditions the piping will be exposed to. Once the carrier sheet 403 is removed, the alloy remains as a protective coating for enhanced corrosion/erosion resistance.

Properties: The substrate protected by the brazed coating layer is characterized as having increased protection properties, as the substrate is alloyed to a higher level with refractory elements that migrate from the brazed coating layer into the substrate in the heat treatment step. For a brazed coating of at least 10 mils (254 μm) and at a depth of 50 μm from the interface of the substrate/coating layer, the substrate has a total concentration of refractory elements of at least 2 wt. % in one embodiment; at a concentration of at least 5 wt. % in a second embodiment. In another embodiment, the substrate has a total concentration of refractory elements of at least 10 wt. % at a depth of 50 μm, and a total concentration of at least 5 wt. % at a depth of 100 μm.

As the brazed coating layer forms a metallurgical bond with the underlying substrate with the migration of the refractory elements, the coating is characterized as having an adhesion strength of at least 7000 psi (48 MPa) measured according to any of ASTM D4541 and ASTM D7234 in one embodiment; and at least 10,000 psi (70 MPa) in a second embodiment. The adhesion strength here is the average adhesion strength across the coating layer.

In one embodiment with a brazed coating of at least 10 mils, the coating layer forms a protective solid non-porous coating layer on the underlying substrate that is impermeable to corrosive environments, characterized as showing no pin holes, pitting ($0/m^2$) in the ferroxyl test according to ASTM A967 Practice E.

Applications: The coatings and methods for applying coatings are particularly suitable for the protection of work pieces, etc., in any of erosive, corrosive, and abrasive environments. In one embodiment, the coating is particularly suitable for use in protecting steel components subject to environments containing sulfur and abrasive sand. In another embodiment, the coating further provides protection for the underlying equipment/substrate with any of wear resistance, heat resistance, insulation, shielding, and conductivity characteristics.

In one embodiment, the coating is for the protection of equipment in the energy and power generation industries, e.g., sections within a coil fired boiler subject to chloride and/or sulfide corrosion as well as erosion attack with produced fly ash, utility boiler waterwall panels, tubes for waste heat exchangers, sulfur recovery boilers, ethylene furnace tubes, metal sheets, by-pass liners. The coating can also be used as a hard chrome alternative and is a cost effective replacement for cladding for use in mining, concrete and cement, paper and pulp processing, chemical processing, and marine applications. In yet another embodiment, the coating is suitable for the protection of mild steel tubing for use in the oil and gas industry (e.g., downhole tubing).

Mild steel equipment, e.g., tubing, is ubiquitous in the oil and gas industry, but does not perform adequately in certain erosive/corrosive applications, including but not to sulfur-containing environments and down-hole exploration. Instead of using a more expensive bulk component such as higher alloy steels such as 9Cr, 11Cr, etc. for some sulfur-containing environments, cost and performance can be optimized using the coatings described herein to protect mild steel equipment.

EXAMPLES

The following illustrative examples are intended to be non-limiting.

Example 1

Figure 4:
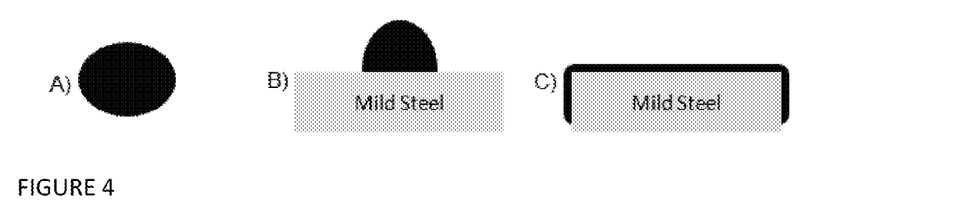
FIG. 4 is a diagram illustrating the coating of a substrate with an embodiment of the brazing alloy as a "button."

A number of brazing alloy buttons (15 g each) comprising compositions Alloy 1-Alloy 7 were fabricated and placed on carbon steel coupons. After heat treatment to a temperature of 1190-1225° C. (2175-2240° F.), it was observed that the alloys had melted and flowed across the carbon steel surface and beyond the original point of contact, creating a coating on the coupon surface as illustrated in FIG. 4.

Example 2

1/16" cored wire was formed from an alloy composition of: Fe (61.7%); Cr (12%); Nb (5%); V (5%); Si (3.6%); B (2.75%); and Al (10%). The material was thermal sprayed onto two steel coupons (4"×4"×0.25") surface using the twin wire arc spray technique to a thickness of 15 mils. The two coupons was inserted into a vacuum furnace and heat treated temperatures of 1190° C. (coupon "A") and 1225° C. (coupon "B") respectively, and held at the elevated temperature for 15-30 min. The heating resulted in the homogenization for a coating that provides corrosion resistance against sulfur-containing corrosive species.

Example 3

Example 2 was repeated with a 1/16" cored wire formed from an alloy composition of: Fe (65.9%); Cr (24.6%); Mo (4.6%); Si (1.5%); and B (2.2%).

Example 4

1/16" cored wire was formed from an alloy composition of: Fe (65.9%); Cr (24.6%); Mo (46%); Si (1.5%); and B (2.2%). The material was thermal sprayed using the twin wire arc spray technique onto a 0.005" thick 430 stainless steel foil, which was wrapped around a 3.5-4.5" pipe at a thickness of 10-30 mils. The stainless steel foil was hose clamped to the pipe during the spray process at each free end. After the desired thickness was achieved, the hose clamps were removed. The sprayed foil was inserted into a second 3.5-4.5" pipe such that the thermal spray coating was in contact with the inner diameter of the second steel pipe.

A thicker 25 mil foil was then wrapped into a cylindrical shape and inserted into the assembly ($2^{nd}$ steel pipe with interior foil) such that the 25 mil foil was actively pressing the foil up against the interior walls due to its tendency to expand into a flat sheet. The entire assembly ($2^{nd}$ steel pipe+interior sprayed 5 mil foil+25 mil foil) was inserted into a vacuum furnace and heat treated to a temperature of 1190° C.-1225° C. and held at that elevated temperature for 15-30 min, resulting in the homogenization of the steel plate.

At the conclusion of this heat treatment (after the assembly has been allowed to cool), the 25 mil interior foil was removed from the center of the pipe and discarded. The 5 mil foil was metallurgically bound to the interior of the pipe allowing with the coating material, providing a corrosion resistant coating against sulfur-containing corrosive species particularly useful for sour service oil and gas upstream applications.

Example 5

Example 4 was repeated with a 1/16" cored wire having a composition of Fe (63.4%); Cr (9.4%); Mo (12.5%); B (1.8%); C (2.5%); and W (10.4%), for a pipe having an interior erosion resistant coating against flowing sand particles, particularly useful for oil and gas upstream applications.

Example 6

A number of steel coupons were coated with a steel alloy composition of: Fe-60.8%, Cr-22.1%, Mo-9.5%, Si-3.6%, B-2.8%, Al-1.1% (Alloy 1) for coating of 15 mils thick, then heat treated at 1190° C. or 1225° C. for 30 minutes in a vacuum furnace. Ferroxyl exposure test according to ASTM A967 Practice E was conducted. Permeability in a ferroxyl exposure test is indicated by formation of blue spots on surface of samples, which is the result of the ferroxyl solution penetrating the coating thickness and reacting with the steel substrate. However, the samples showed no permeability to the mild steel substrate with the ferroxyl solution remained yellow during the duration of the test.

Example 7

Example 6 was duplicated, but the steel coupons were coated with a nickel alloy having a composition of: Ni-57%, B-0.4%, Si-1%, Cr-27.6%, Mo-14%. The coupons showed permeability with the formation of blue spots on the coating surface.

Example 8

Example 6 was duplicated but the coating was not heat treated. Ferroxyl exposure test was carried out with the coupons having as-sprayed coatings. The coupons showed permeability.

Example 9

Example 6 was duplicated and the steel coupon was coated with Alloy 3: Fe-56.8%, Cr-21.6%, Mo-12.8%, Si-5.6%, B-2.2%, Al-1.1%. After heat treatment, it was noted that the Cr, Si, and Al species selectively diffused into the steel substrate. However, the Mo due to its large size and preference to react with Si preferentially formed molybdenum disilicide, $MoSi_2$ and remained in the coating layer. $MoSi_2$ is a common engineering ceramic which has additional uses beyond its inherent thermal insulating properties, such as high oxidation resistance and high temperature strength. The Mo content in the coating layer increased at least 5% as a result of the heat treatment.

Example 10

Figure 5A:
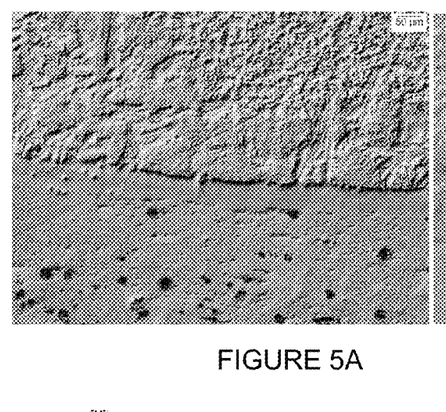
FIG. 5A is an optical micrograph and FIG. 5B is a scanning electron micrograph showing an embodiment of the interface of a coating formed on a mild steel substrate.
Figure 5B:
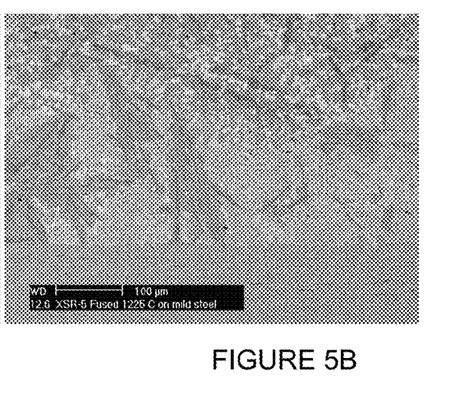

Micro-structural evaluation of a carbon steel coupon formed with a 15 mil thermal sprayed coating of Alloy 1 (Fe-60.8%, Cr-22.1%, Mo-9.5%, Si-3.6%, B-2.8%, Al-1.1%) and fused at 1225° C. for 15 minutes. FIG. 5A is an optical micrograph, and FIG. 5B is a scanning electron micrograph (SEM). As shown in the SEM, the alloy in fused condition formed a concentrated chromium phase (phase 1) and a concentrated refractory phase (phase 2). These phases form a needle-like structure at the interface and develop into a block-like structure over 100 μm into the alloy coating as shown.

Figure 6:
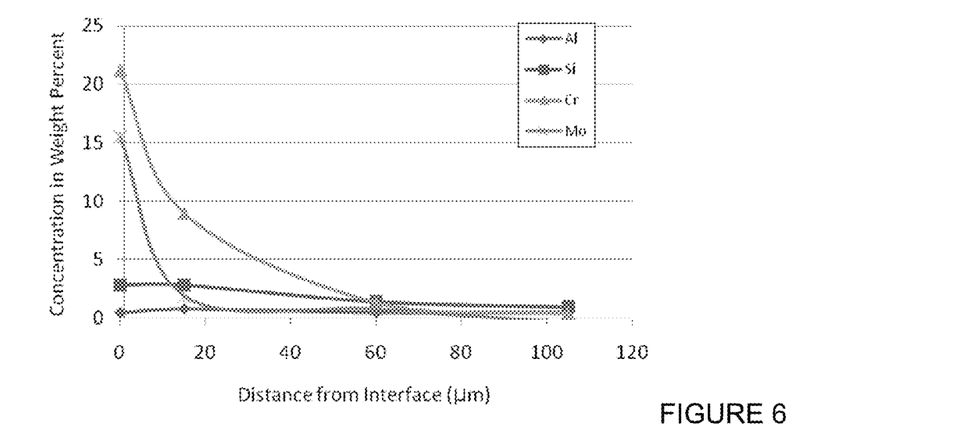
FIG. 6 is a graph from an energy dispersive spectroscopy (EDS) evaluation showing diffusion of alloying elements across the interface in FIGS. 5A-5B.
Figure 7:
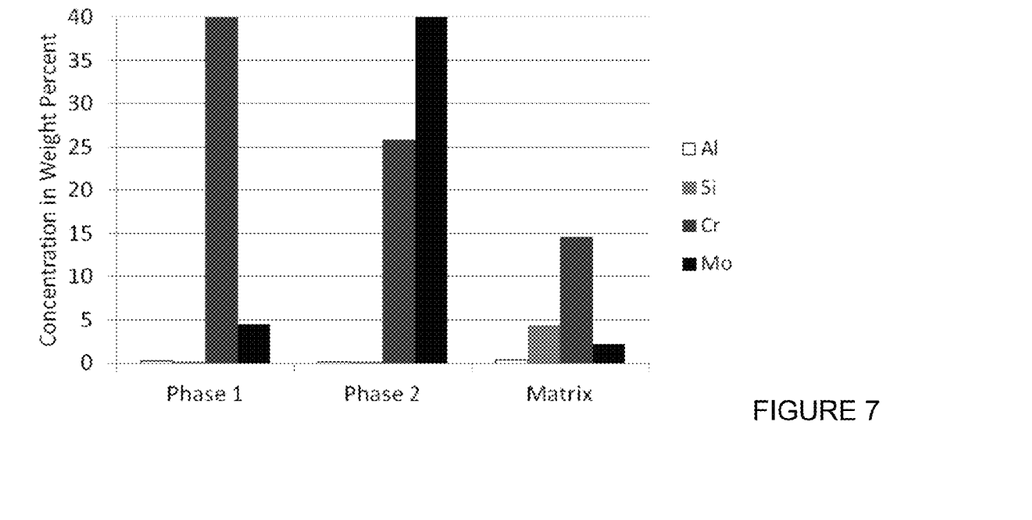
FIG. 7 is another graph from the EDS evaluation showing the chemistry of the phases in the alloy coating of FIGS. 5A-5B.

Energy dispersive spectroscopy (EDS) evaluation was carried out, and results are illustrated in the graphs of FIGS. 6 and 7. FIG. 6 shows the diffusion of the alloying elements measured as a function of the distance away from the interface and travelling into the bulk of the substrate. FIG. 7 shows the chemistry of the phases within the fused alloy coating layer. As shown, the refractory element Cr most effectively fused into the carbon steel substrate, followed by Si and Mo. The retained Mo content in the alloy coating matrix was 2.2 wt. %. The concentration of Mo and Si are minimal in the bulk of the substrate.

Example 11

In this example, micro-structural and EDS evaluations were conducted on a carbon steel coupon formed with a 15 mil thermal spray coating of Alloy 2 (Fe-60.8%, Cr-22.1%, Nb-4.8%, V-4.8%, Si-3.6%, B-2.8%, Al-1.1%), fused at 1225° C. for 15 minutes.

Figure 8A:
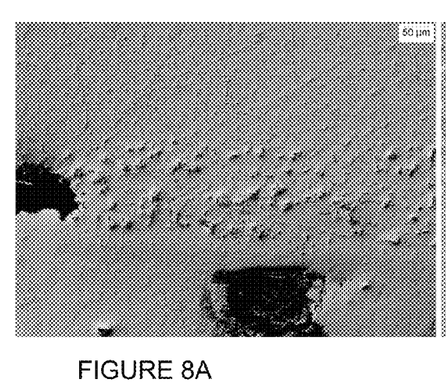
FIG. 8A is an optical micrograph and FIG. 8B is a scanning electron micrograph showing another embodiment of the interface of a coating formed on a mild steel substrate.
Figure 8B:
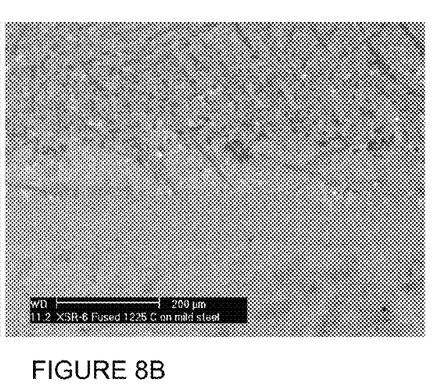
Figure 9:
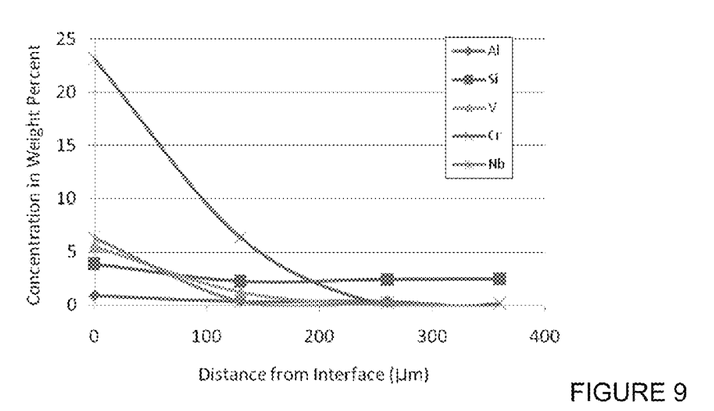
FIG. 9 is a graph from an energy dispersive spectroscopy (EDS) evaluation showing diffusion of alloying elements across the interface in FIGS. 8A-8B.
Figure 10:
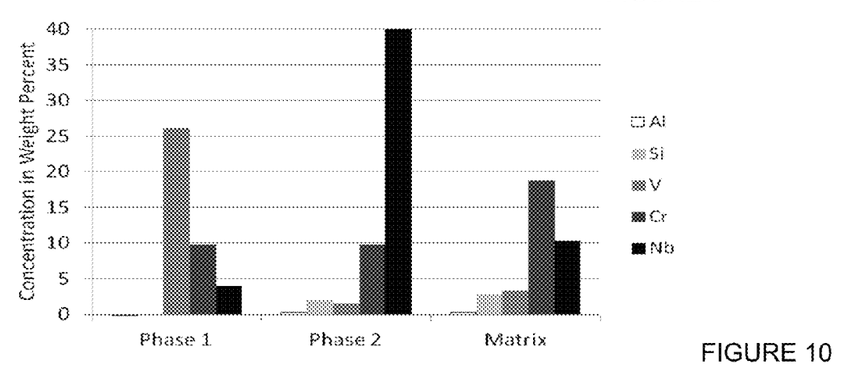
FIG. 10 is another graph from the EDS evaluation showing the chemistry of the phases in the alloy coating of FIGS. 8A-8B.

FIG. 8A is an optical micrograph, and FIG. 8B is a scanning electron micrograph (SEM). The white phase in the SEM is likely NbB, and the dark phase is likely a V borocarbide phase. The EDS in FIG. 9 shows extensive diffusion of Cr and Si into the carbon steel substrate, with elevated levels of Cr (5 wt %) and Si (3-4%) at distance of 100 μm into the substrate, expected to provide excellent corrosion resistance properties. Furthermore as shown in FIG. 10, the total refractory content in the coating matrix remained relatively high after fusing at ~13.5 wt. % (10.25 wt. % Nb and 3.25 wt. % V).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A work piece for use in an abrasive environment, the work piece comprising:
    a metal substrate having a melting point of $T_s$;
    a carrier sheet having a first side and a second side opposite the first side, the second side having a coating layer deposited thereon, wherein the carrier sheet is applied to the work piece such that the second side is in contact with the work piece and the first side is facing away from the work piece;
    the coating layer from a single-component feedstock consisting of a composition in weight % of: Fe (55-65%), Cr (0-30%), R (4-30%), Si (0-10%), B (0-3%), and Al (0-20%), wherein R is two or more refractory elements V and Nb, wherein the coating layer comprises a matrix component and at least one additional phase component, the matrix component comprising a total refractory content, excluding Cr, of approximately 13.5%, and the coating having a melting point of Tm;
    wherein at least a portion of the refractory elements in the coating layer diffuse into the metal substrate for the metal substrate to have a gradient composition, in which the metal substrate is alloyed with at least a portion of the refractory elements for the metal substrate at a depth at least 25 μm from an interface between the coating layer and the substrate to have a concentration of refractory elements of at least 25% of a concentration of refractory elements in the coating layer.

2. The work piece of claim 1, wherein the metal substrate at a depth at least 50 μm from the interface to have a concentration of refractory elements of at least 25% of the concentration of refractory elements in the coating layer.

3. The work piece of claim 1, wherein the coating layer has an adhesion strength of at least 7,000 psi measured according to ASTM D4541.

4. The work piece of claim 1, wherein the coating layer has an adhesion strength of at least 10,000 psi measured according to ASTM D4541.

5. The work piece of claim 1, wherein the coating layer forms a protection layer impermeable to corrosive environments, characterized as showing no pin pitting ($0/m^2$) in a ferroxyl test according to ASTM A967 Practice E.

6. The work piece of claim 1, wherein the coating layer has a thickness of 0.5 to 150 mils (12.7-3810 μm).

7. The work piece of claim 6, wherein the coating layer has a thickness of 5 to 50 mils (127-1270 μm).

8. The work piece of claim 1, wherein the metal substrate is alloyed with at least a portion of the refractory elements in a heat treatment operation at a temperature above $T_m$ and below Ts for at least a portion of the refractory elements to diffuse into the metal substrate.

9. The work piece of claim 1, wherein the at least two refractory elements V and Nb are in equal weight proportions.

10. The work piece of claim 1, wherein the work piece is any of a heat exchanger tube, a utility boiler waterwall panel, a sulfur recovery boiler, an ethylene furnace tube, a metal sheet, a by-pass liner, and a tubing for down hole exploration.

11. The work piece of claim 1, wherein the at least a portion of the refractory elements in the coating layer diffuse into the metal substrate by heat treatment for 15-60 minutes.

12. The work piece of claim 1, wherein the at least a portion of the refractory elements in the coating layer diffuse into the metal substrate by induction heating.

13. A tubing for use in a corrosive environment, having a protective corrosion resistant layer on its interior surface, the tubing comprises:
    a carrier sheet having two edges, a first side and a second side opposite to the first side having a protective layer deposited thereon, the protective layer prepared from a single-component feedstock consisting of a composition in weight % of: Fe (55-65%), Cr (0-30%), R (4-30%), Si (0-10%), B (0-3%), and Al (0-20%), wherein R is two or more refractory elements V and Nb, the protective layer comprising a matrix component and at least one additional phase component, the matrix component comprising a total refractory content, excluding Cr, of approximately 13.5%;
    wherein the carrier sheet is inserted into the tubing for the two edges to overlap and for the first side to form the surface exposed to the corrosive environment, and for the second side with the protective layer to be in contact with the interior surface of the tubing; and
    wherein the carrier sheet upon being subject to heat treatment, having at least a portion of the refractory elements in the protective layer diffuse into the interior surface of the tubing forming a metallurgical bond with the tubing;
    wherein the protective layer has an adhesion strength of at least 7,000 psi measured according to ASTM D4541.

14. The tubing of claim 13, wherein the carrier sheet is a flexible metal sheet, which can be subsequently removed or corroded away on its own.

15. The tubing of claim 13, wherein the protective layer has an adhesion strength of at least 10,000 psi measured according to ASTM D4541.

16. The tubing of claim 13, wherein the protective layer has a thickness of 0.5 to 150 mils (12.7-3810 μm).

* * * * *